April 26, 1966  L. L. KEPKAY  3,247,855
AUXILIARY RETHRESHER FOR A COMBINE
Filed March 13, 1962  3 Sheets-Sheet 2
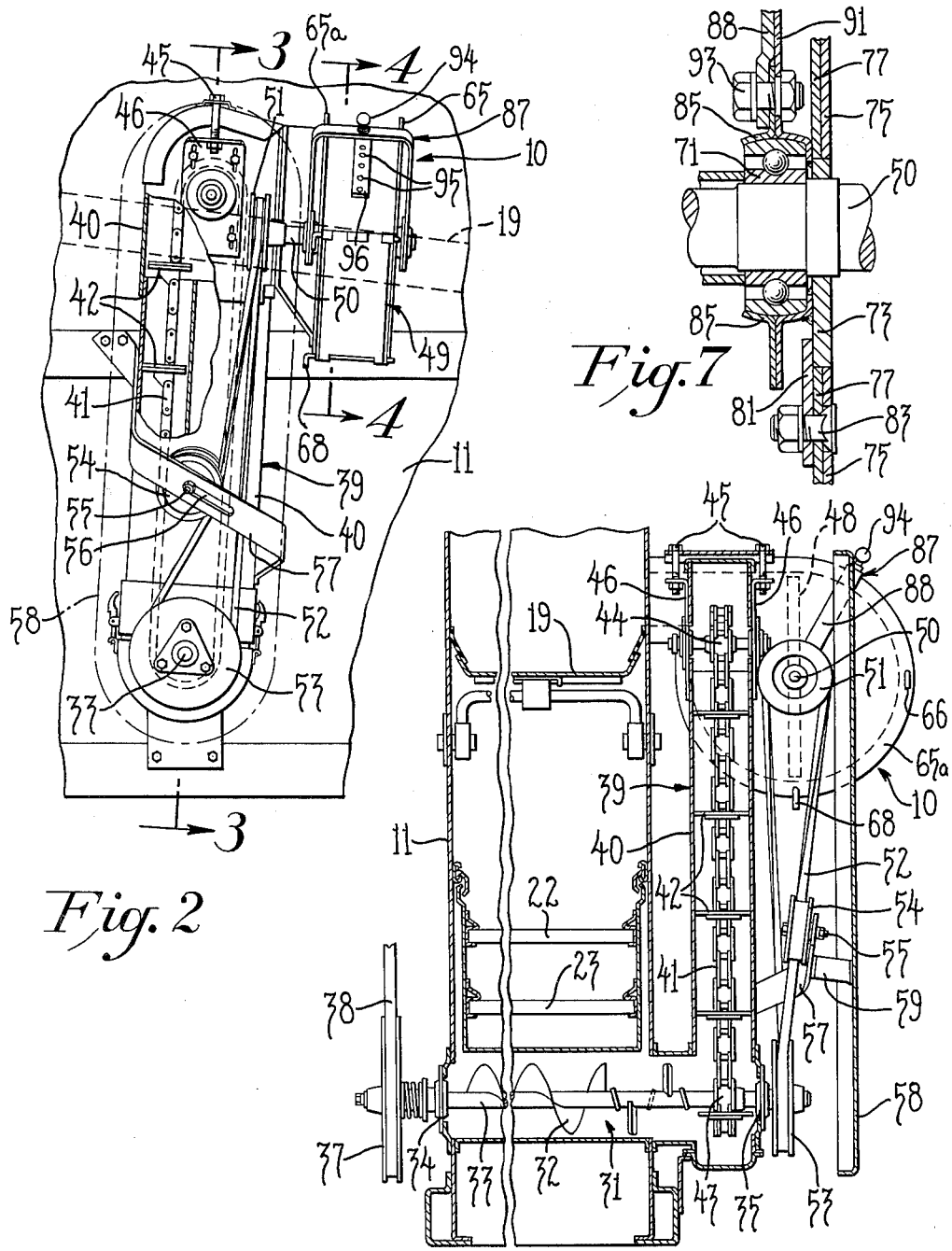
INVENTOR.
LESLIE L. KEPKAY
BY
Wolfe, Hubbard, Voit & Osann
ATTORNEYS.

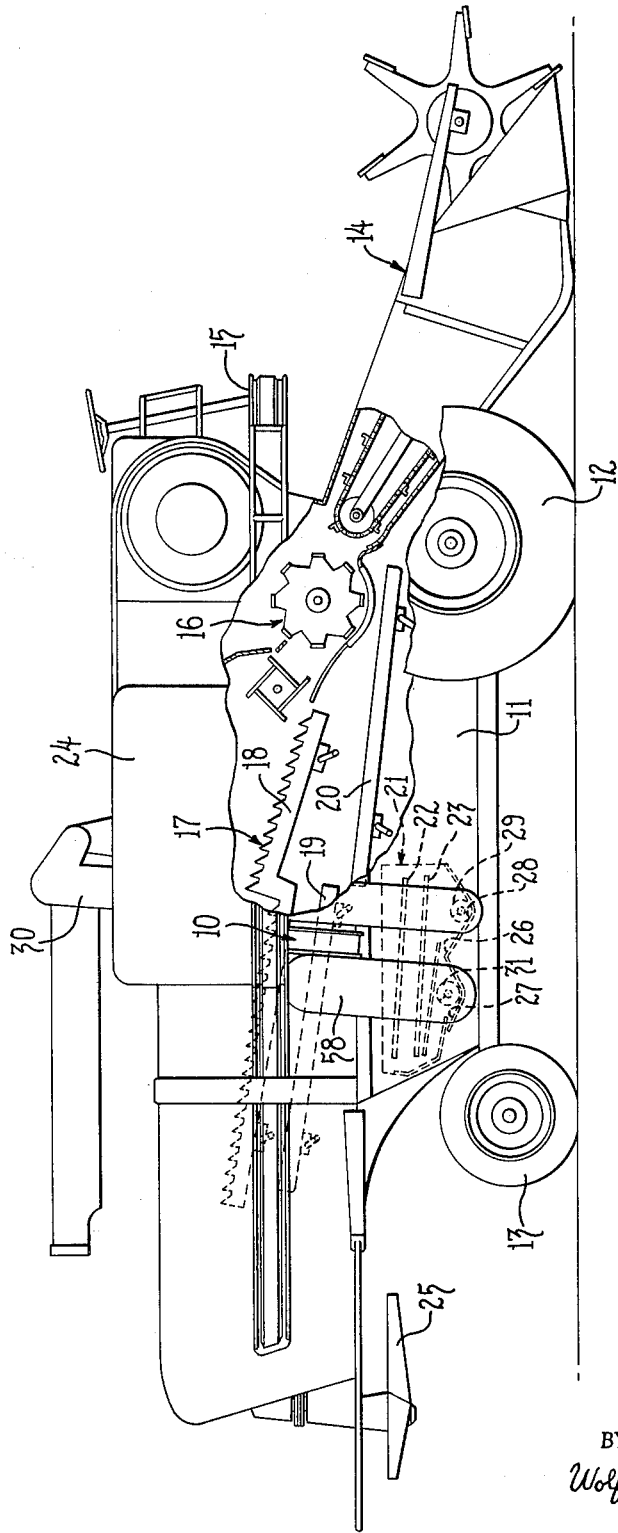

April 26, 1966 L. L. KEPKAY 3,247,855
AUXILIARY RETHRESHER FOR A COMBINE
Filed March 13, 1962 3 Sheets-Sheet 3
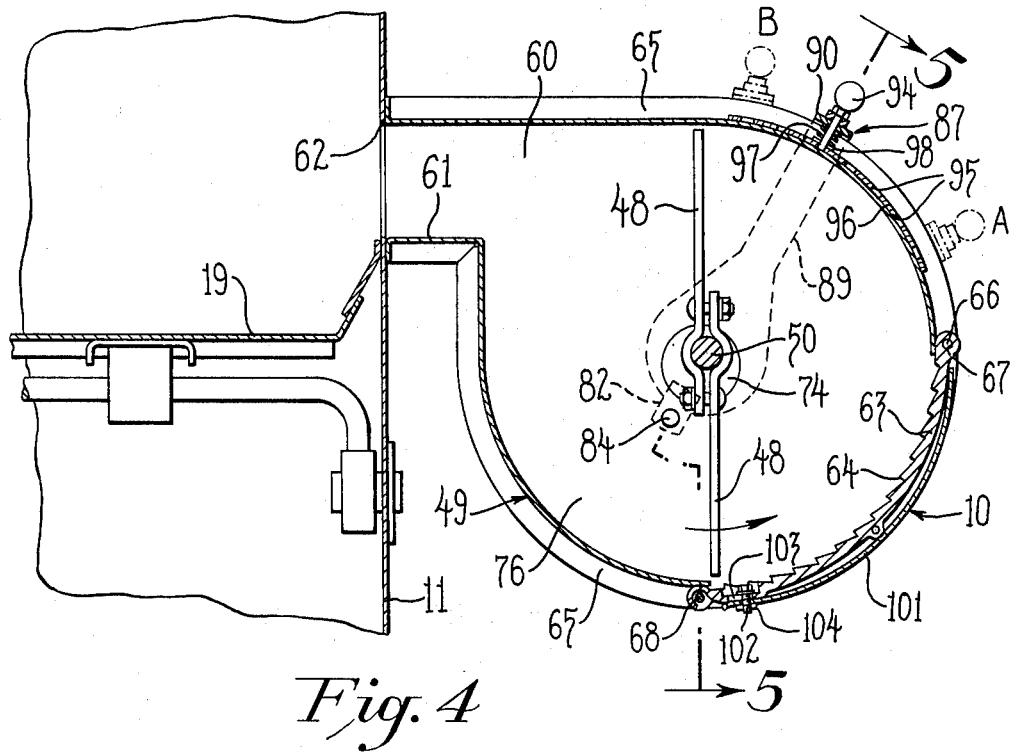
Fig. 4
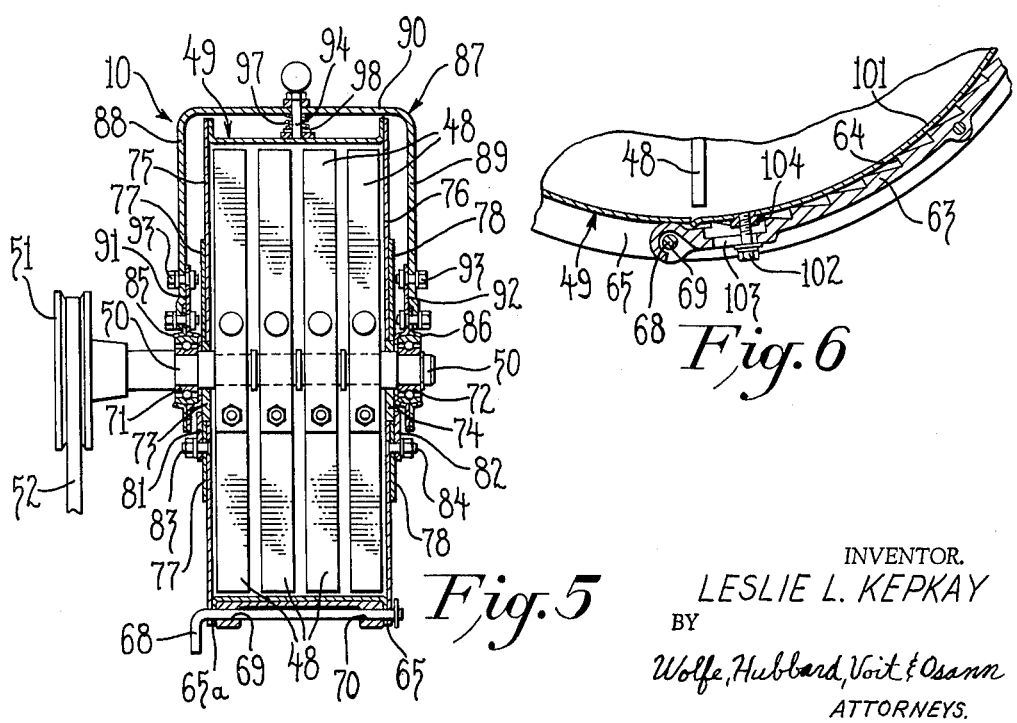
Fig. 5
Fig. 6
INVENTOR.
LESLIE L. KEPKAY
BY
Wolfe, Hubbard, Voit & Osann
ATTORNEYS.

United States Patent Office 3,247,855
Patented Apr. 26, 1966

3,247,855
AUXILIARY RETHRESHER FOR A COMBINE
Leslie L. Kepkay, Toronto, Ontario, Canada, assignor to Massey-Ferguson Limited, Toronto, Ontario, Canada
Filed Mar. 13, 1962, Ser. No. 179,315
4 Claims. (Cl. 130—27)

This invention relates generally to agricultural combines and more particularly concerns a device for receiving the collected tailings from the separating and cleaning units of a combine, rethreshing the tailings and returning them for reprocessing to the separating and cleaning units.

Tailings return systems for improving the efficiency of combines are known in the art. An example of an improved system of this type is disclosed in U.S. application Serial No. 55,353, filed September 12, 1960, now abandoned, by Robert Ashton and Leslie L. Kepkay, and entitled "Tailings Distribution System for a Combine." The function of this improvement is to collect the tailings from the sieves of the combine and return them properly distributed to the cleaning and separating units for reprocessing. In this way, the grain handling capacity of a combine is increased and it is possible to efficiently handle a large volume of tailings so that the combine can be operated at a rapid rate without high grain losses.

A further development from a simple tailings return arrangement is the inclusion of a rethreshing unit in the distribution system. A system of this type is shown in my U.S. application Serial No. 109,038, filed May 10, 1961, now Patent No. 3,115,142, entitled "Tailings Handling Device for a Combine." The function of this improvement is to subject the collected tailings to a rethreshing action prior to recirculating them to the cleaning and separating units of the combine. In this way it has been found that grain separation has been further enhanced and the range of operating conditions, as well as the efficiency of the combine, has been increased.

It is the general aim of the present invention to provide an improved tailings rethreshing and return system of the type discussed generally above and which functions with increased efficiency while being more economical to manufacture and easy to install and operate.

In greater detail, it is an object of the invention to provide an improved tailings handling device of the above character which incorporates a simplified rethreshing unit within the framework of a tailings distribution system.

More specifically, it is an object to provide a device of the above type in which rethreshing unit blades are arranged to minimize an air pumping or blower effect while insuring an adequate threshing action.

It is a further object to provide a device as described above in which the rethreshing unit may be easily adjusted to accommodate different types of grain and harvesting conditions. A related object is to provide such an adjusting arrangement which may be easily calibrated or coordinated with operating instructions or indicia for various crops and conditions.

An additional object is to provide a device of the above type in which the rethreshing unit may be easily deactivated by positioning an easily fitted part that is conveniently stored on the unit when not in use.

It is also an object to provide a tailings handling device which may be readily opened for cleaning and inspection.

Other objects and advantages of the invention will become apparent upon reading the following detailed description and upon reference to the drawings, in which:

FIGURE 1 is a side elevation of a combine, with portions broken away, having an improved tailings handling device embodying the present invention;

FIG. 2 is an enlarged fragmentary elevation, with portions broken away, of the tailings handling device shown in FIG. 1;

FIG. 3 is a fragmentary section taken along the line 3—3 in FIG. 2;

FIG. 4 is an enlarged fragmentary section taken along the line 4—4 in FIG. 2;

FIG. 5 is a section taken along the line 5—5 in FIG. 4;

FIG. 6 is an enlarged fragmentary section similar to FIG. 4 and showing the parts in alternate positions; and FIG. 7 is an enlarged fragmentary portion of FIG. 5 so as to better illustrate certain details.

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Turning now to the drawings, there is shown a combine having a tailings handling device or unit 10 embodying the invention mounted on a main body or frame 11 that is supported by front driving wheels 12 and rear steering wheels 13. A grain header assembly 14 is carried at the forward end of the combine for harvesting the crop and an operator's platform 15 is disposed at the front of the combine so as to overlook the header assembly.

The combine body 11 encloses a cylinder unit 16 for threshing the grain in the incoming crop material that is received from the header assembly 14. The crop material is then passed to a separating unit 17, which includes straw walkers 18, for separating the larger pieces of refuse material from the grain. A fan (not shown) directs a blast of air upwardly through the separating unit 17 which raises the lighter refuse material above the straw walkers 18 and aids the straw walkers in separating the refuse material from the grain.

The conglomeration of grain, chaff and smaller bits of refuse material that falls through the straw walkers 18 is received by grain pans 19 and 20. The grain pans 19, 20 then direct the material to a shaker shoe assembly 21 having a chaffer sieve 22 and a shoe sieve 23 that receive the grain for final cleaning before it is deposited in a clean grain storage bin 24. The chaffer sieve 22 filters the larger bits of refuse material out and the air blast cooperates with the chaffer sieve 22 to move this refuse material through the open back of the combine over a rotatably driven straw scatterer 25. The overflow from the chaffer sieve 22 falls onto a channeled bottom 26 of the shaker shoe assembly 21 and drops into a tailings trough 27.

The material that falls through the chaffer sieve 22 is agitated by the shoe sieve 23. The shoe sieve 23 passes clean grain into a clean grain trough 28 formed in the bottom 26 of the shaker shoe assembly. This clean grain is moved by an auger 29 to a clean grain elevator 30 which lifts the harvested material into the grain storage bin 24. The overflow from the shoe sieve 23 also falls to the bottom 26 of the shaker shoe assembly and finds its way into the tailings trough 27.

As part of the tailings return system, a tailings or cross conveyor 31 is placed in the tailings trough 27 so as to move the tailings to one side of the combine. The tailings conveyor 31 includes an auger flight 32 carried on a shaft 33 that is journaled in spaced bearings 34 and 35. For imparting rotational movement to the cross conveyor 31, a pulley 37 is secured to the auger shaft 33 and is driven by a belt 38 from the main drive of the combine.

To lift the tailings to the separating unit 17, an elevator 39 is disposed at one side of the combine so as to receive the tailings from the cross conveyor 31. The elevator 39 includes a rectangular tube 40 enclosing a chain 41 which carries paddles 42 for lifting the tailings to the level of the separating unit. The chain 41 is driven by a power sprocket 43 attached to the auger shaft 33, which receives the chain 41. At the upper end of the elevator 39 the chain is held by an idling or chain tensioning sprocket 44. Tension adjusting bolts 45 are anchored at the upper end of the elevator to loosen or tighten the chain 41 by shifting plates 46 in which the tensioning sprocket 44 is journaled.

To guard against plugging the elevator 39, the continuity of the tailings auger flight 32 is broken at the discharge end of the conveyor 31 adjacent the elevator. In this way, an impositive feeding action is exerted on the tailings at the input to the elevator and the likelihood of jamming or plugging of the elevator is minimized.

In keeping with the invention, an improved tailings handling unit 10 is located adjacent the top of the elevator 39 to receive the elevated tailings and subject them to a rethreshing action before propelling them across the breadth of the grain pan 19. In this way, that part of the harvested material which was not effectively threshed in the cylinder 16 is subjected to a rethreshing action, and the collected tailings, chaff and rethreshed grain is then readmitted to the separating and cleaning units of the combine.

Rethreshing within the unit 10 is accomplished by the rotation of a plurality of blades 48 enclosed within a housing 49. These blades 48 are attached to and radially project from a shaft 50 to which is affixed a drive pulley 51. The blades are rotated by a belt 52 which extends about the pulley 51 and a drive pulley 53 on the end of the tailings auger shaft 33. An idler pulley 54 serves to maintain proper tension of the belt 52. Adjustment of the idler 54, as shown here, is by positioning an idler carrying bolt 55 in a slot 56 contained in a strap 57 which is secured to the combine body 11. A safety shield 58 is positioned adjacent the belt 52 and pulleys 51, 53, 54 on tabs 59 secured to the strap 57.

The dimensions of pulleys 51 and 53 are preferably chosen so that the tailings, upon reaching the housing 49 after leaving the elevator 39, are accelerated by the blades 48 to prevent pile-up and clogging in the housing 49. In the preferred embodiment, for example, the tip speed of the blades 48 is approximately 2½ to 3½ times the speed of the elevator chain 41 and thus the tailings are accelerated in that ratio when moving from the elevator into the housing.

Upon being elevated to the impeller assembly, the tailings are driven by the blades 48 within the housing 49 in the direction of the arrow in FIG. 4 through an arc of about 270° which accelerates the material sufficiently so that centrifugal force flings the tailings against the impeller assembly housing 49 and through an opening 60 formed in the housing. A tube 61 is extended tangentially of the housing 49 from the opening 60 to an opening 62 in the combine body 11 so that the tailings, directed by the tube 61, are propelled into the separating unit 17 above the pan 19 at a substantial velocity.

To increase the rethreshing efficiency of the unit 10, a portion of the cylindrical housing 49 comprises an arcuate rethreshing wall 63 having a roughened or irregular inner surface formed by steps or corrugations 64 (see FIG. 4). The rethreshing wall 63 as shown here, is hinged at its upper end to peripheral flanges 65, 65a of the housing 49 by a hinge pin 66 inserted through an opening 67 in the wall 63 and associated holes in the flange members. The lower end of the rethreshing wall is similarly secured in place by means of a retractable pin 68 inserted through openings 69, 70 in the wall and associated openings in the flanges 65, 65a. Thus, it may be seen that the housing 49 may be easily opened by withdrawing the pin 68 and swinging the rethreshing wall 63 outwardly.

Pursuant to the present invention, the impeller blades 48 are secured to the shaft 50 in an axially spaced relationship (see FIG. 5). The free space between adjacent blades has been found to afford a better rethreshing action due to the increased churning and turbulence of the tailings within the housing 49. In other words, as the blades 48 sweep upwardly, a portion of the circulating tailings sift through the space between the blades and falls toward the bottom of the housing 49. The next sweep of the blades 48 serves to repeat the threshing action by again driving the tailings up and around the rubbing surface of the rethresher wall 63. This churning action continues until the tailings are carried past the rethreshing wall and pitched by the sling action of the impeller blades 48 through the tube 61 into the combine body.

In addition, the spaced relationship of the blades 48 greatly reduces the "fanning" tendency within the housing 49 which is detrimental to the desired rethreshing action. It will be understood that a solid impeller blade, substantially the same width as the housing 49, would tend to blow or pump the circulating tailings around the inner surface of the housing 49 and thence into the combine. A large volume of tailings would thus be carried by this flow of air rather than be physically impelled by the blades themselves, with the result that the rethreshing action would be greatly diminished. The construction embodying the present invention greatly reduces the flow of captured air and the "fanning" tendency of the impeller blades 48 by allowing the air to escape between the blades.

In order to adjust the running clearance between the impeller blades 48 and the rethreshing wall 63 for accommodating different crops, the impeller shaft 50 is journaled in bearings 71 and 72 mounted on eccentric blocks 73 and 74. The eccentric blocks 73, 74 are rotatably seated in openings in respective parallel sides 75 and 76 of the housing 49 which are reinforced by plates 77 and 78 secured to the sides 75, 76 and adjacent the bearings 71, 72. To prevent the eccentrics from slipping out of their respective seats, restraining clips 81, 82 are secured to the sides 75, 76 by bolts 83, 84 so as to overlap the eccentrics 73, 74 (see FIGS. 4 and 7).

In the illustrated construction, the bearings 71, 72 are enclosed in bearing holders 85 and 86 which are welded to the eccentric blocks 73, 74. This provides a particularly economical eccentric mounting for the bearings 71, 72.

To adjust the eccentric blocks 73, 74, a handle 87 having side portions 88 and 89 and a saddle portion 90 overlies the outer surface of the housing 49 and is secured to upwardly projecting extensions 91 and 92 of the bearing holders 85, 86 by bolts 93. A lock pin 94 is slidably carried on the saddle 90 of the handle 87 and is adapted for insertion into any one of a plurality of holes 95 disposed in an arcuate positioning strip 96 secured to the outer surface of the housing 49. A small compression spring 97 located between the under side of the saddle 90 and a restraining collar 98 on the pin 94 serves to maintain the pin 94 biased inwardly toward the positioning strip 96 and in registry with one of the holes 95.

It will be appreciated that rotation of the handle 87 rotates the associated eccentric blocks 73, 74 and thus causes the impeller shaft 50 to shift radially within the housing 49. This permits adjustment of the running clearance between the blades 48 and the rethreshing wall 63. Thus, when the handle 87 and lock pin 94 are moved to the dashed line position A seen in FIG. 4, the eccentric blocks 73, 74 cause the shaft 50 to shift down and to the right, as seen in this figure, thereby moving the blades 48 closer to the rethreshing wall 63. On the other hand, when maximum clearance is desired, the handle 87 may be moved to dashed line position B causing the eccentric blocks to lift the shaft 50 and blades 48 up and away from the rethreshing wall. The lock pin 94 may, of course, be inserted in any of the locating holes 95 between these two extremes depending on the type of crop and the harvesting conditions.

The ease with which the handle 87 may be moved will be apparent and it will be understood that this adjustment may be made under field conditions without the use of tools. It should also be appreciated that the holes 95 in the positioning strip 96 may be numbered, or otherwise designated, and reference to the appropriate position of the lock pin 94 can conveniently be made in the combine operator's manual for a variety of harvesting conditions. Alternatively, a decal, or the like, containing the same information could be attached to the housing 49 adjacent the positioning strip 96. In this way trial and error in adjusting the blades 48 may be largely eliminated and maximum efficiency of operation achieved.

When, due to harvesting conditions, the rethreshing action of the unit 10 is not needed, the wall 63 may be easily deactivated. This is accomplished by inserting a smooth metal bank 101 is nested relationship over the roughened surface of the wall 63, as shown in FIG. 6. The blank is easily secured in place by inserting a cap screw 102 through a slotted opening 103 in the wall 63 and into a threaded receiving tab 104 on the blank 101. When not in use, the blank 101 is conveniently stored adjacent the outer side of the wall with the cap screw 102 being reversed to hold the plate in position.

It may now be seen that there has been provided a simplified rethreshing unit which may be easily and conveniently installed outside the combine to cooperate with collecting and elevating components of a typical tailings distribution system. It is also obvious that the unit may be economically manufactured by customary mass production techniques and that cleaning and maintenance is both simple and convenient.

Since the impeller shaft 50 may be easily shifted in respect to the rethreshing wall 63 simply by positioning a handle 87 outside the housing 49, the operator can readily adjust the running clearance of the rethreshing blades 48 to accommodate a variety of crops and harvesting conditions.

I claim as my invention:

1. A tailings handling device for a combine, comprising, in combination, a generally circular housing having parallel side walls arranged for receiving the tailings from the combine, said housing having an arcuate section in the lower portion thereof formed with a roughened inner surface, a plurality of axially spaced rotatable blades disposed in said housing, means for driving said blades to engage said tailings in rubbing contact with said roughened surface, and means including a shaft journalled in eccentric bearing blocks rotatably mounted on said side walls for adjusting the running clearance between said blades and said roughened surface.

2. A tailings handling device for a combine, comprising, in combination, a generally circular housing having parallel side walls arranged for receiving the tailings from the combine, said housing having an arcuate section formed with a roughened inner surface, a rotatable shaft disposed within said housing parallel to said surface, said shaft having a plurality of axially spaced blades fixedly secured thereto and radially projecting therefrom, means for driving said shaft so that said blades engage said tailings in rubbing contact with said roughened surface, a pair of eccentric bearing blocks rotatably mounted on said side walls for journalling said shaft, a handle for rotating said blocks and thereby radially shifting said shaft so as to adjust the running clearance between said blades and said roughened surface, and a lock for selectively locating and locking said handle in any one of a plurality of predetermined positions relative to said housing.

3. A tailings handling device for a combine having a cleaning and separating unit, comprising, in combination, a generally circular housing having vertically disposed parallel side walls located adjacent the cleaning and separating unit of the combine, said housing having an input opening in one of said side walls for receiving tailings from the combine and a discharge opening formed by a tangential extension of said circular housing for returning said tailings to the combine above said cleaning and separating unit, a shaft journaled in bearings secured to eccentric blocks rotatably mounted on the side walls of said housing, said shaft having a plurality of axially spaced impeller blades fixedly secured thereto and projecting radially therefrom into close proximity to said circular housing, means for rotating said shaft and blades, said circular housing having an arcuate section in the lower portion thereof formed with a roughened inner surface, and means for rotating said eccentric blocks so as to regulate the running clearance between said blades and said housing.

4. For use with a combine having a tailings returns system, a tailings handling device comprising, in combination, a generally circular housing having vertical side walls arranged for receiving the tailings from the returns system, a passageway connecting said housing and said combine, said housing having an arcuate section in the lower portion thereof formed with a roughened inner surface, a rotatable shaft disposed in said housing, said shaft having a plurality of impeller blades secured thereto and projecting radially therefrom into close proximity to said roughened surface, means for driving said blades to rub said tailings against said roughened surface and projecting them through said passageway and into the combine, said blades being axially spaced on said shaft to allow air and a portion of the tailings to flow between them, said shaft being journaled in bearings secured to eccentric blocks which are positionable on said housing so as to adjust the running clearance between said blades and said roughened surface, a handle secured to said eccentric blocks for selectively positioning the blocks and thus radially shifting said shaft, and a lock for securing said handle in any one of a plurality of predetermined positions.

References Cited by the Examiner

UNITED STATES PATENTS

| 463,883 | 11/1891 | Adams | 130—27.6 |
| 467,477 | 1/1892 | Buchanan | 130—27.35 |
| 616,899 | 1/1899 | Chalfant | 130—27.6 |
| 816,823 | 4/1906 | Robby | 130—2 |
| 2,159,664 | 5/1939 | Lindgren | 130—27.9 |
| 2,376,618 | 5/1945 | Paradise et al. | 130—27.35 |
| 2,569,193 | 9/1951 | Pool et al. | 130—27.35 |
| 2,642,877 | 6/1953 | Dodge et al. | 130—27.8 |
| 2,875,768 | 3/1959 | Belkowski et al. | 130—27.6 |

FOREIGN PATENTS 6,781 10/1901 Austria.

ABRAHAM G. STONE, Primary Examiner.

ARNOLD RUEGG, Examiner.

J. SPENCER OVERHOLSER, T. GRAHAM CRAVER, JOE O. BOLT, JR., Assistant Examiners.